US010731701B2

(12) United States Patent
Goy et al.

(10) Patent No.: US 10,731,701 B2
(45) Date of Patent: Aug. 4, 2020

(54) HIGH EFFICIENCY GEAR PUMP BEARING ASSEMBLY

(71) Applicant: HAMILTON SUNDTRAND CORPORATION, Charlotte, NC (US)

(72) Inventors: Edward W. Goy, Crystal Lake, IL (US); Joseph Wetch, Roscoe, IL (US); Jeffrey A. Stadler, Roscoe, IL (US); Ernest W. Samotshozo, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/042,353

(22) Filed: Jul. 23, 2018

(65) Prior Publication Data
US 2020/0025241 A1    Jan. 23, 2020

(51) Int. Cl.
*F16C 27/02*    (2006.01)
*F16C 17/02*    (2006.01)
*F04C 2/08*    (2006.01)
*F16C 35/02*    (2006.01)

(52) U.S. Cl.
CPC .............. *F16C 17/02* (2013.01); *F04C 2/082* (2013.01); *F16C 35/02* (2013.01); *F04C 2240/50* (2013.01); *F16C 2360/42* (2013.01)

(58) Field of Classification Search
CPC ........ F16C 25/02; F16C 27/02; F16C 27/063; F16C 35/02; F04C 2/08; F04C 2/082; F04C 2240/50; F04C 2240/56
See application file for complete search history.

(56) References Cited

U.S. PATENT DOCUMENTS

| 1,759,426 A * | 5/1930 | Unger ................. B42F 13/0026 402/2 |
| 3,752,608 A * | 8/1973 | Knowles ................. F04C 2/082 418/131 |
| 3,790,316 A | 2/1974 | Turolla |
| 8,534,389 B2 | 9/2013 | Gallifet et al. |
| 2012/0087608 A1* | 4/2012 | Roessler ................. F16C 17/02 384/215 |
| 2014/0271313 A1* | 9/2014 | Flavelle ................. F01C 11/002 418/205 |
| 2016/0230760 A1* | 8/2016 | Tommasini ............... F04C 2/20 |
| 2017/0130729 A1 | 5/2017 | Getto et al. |

FOREIGN PATENT DOCUMENTS

| EP | 2868925 A1 | 5/2015 | |
| GB | 1273246 A * | 5/1972 | ............. F01C 21/02 |
| JP | H03286197 A | 12/1991 | |

OTHER PUBLICATIONS

Extended European Search Report for International Application No. 19187655.6 dated Oct. 22, 2019, 7 pages.

* cited by examiner

*Primary Examiner* — Phillip A Johnson
(74) *Attorney, Agent, or Firm* — Cantor Colburn LLP

(57) ABSTRACT

A bearing assembly for a gear pump that includes a bearing housing, a bearing, and a biasing member. The bearing housing has a housing bore that extends between a first housing end and a second housing end along a bearing axis. The bearing is disposed within the housing bore. The bearing has an outer diameter extending between a first bearing end and a second bearing end. The biasing member is disposed between the bearing and the bearing housing to apply a biasing load to the bearing.

11 Claims, 2 Drawing Sheets

HIGH EFFICIENCY GEAR PUMP BEARING ASSEMBLY

BACKGROUND

Gear pumps are provided with bearings and gears that require tight clearances to maintain volumetric efficiencies. Commonly the bearings gears are machined to closely fit within a gear pump housing. Alternatively, the bearings or gears may be provided with larger clearances that may reduce volumetric efficiencies of the gear pump.

SUMMARY

Disclosed is a bearing assembly for a gear pump that includes a bearing housing, a bearing, and a biasing member. The bearing housing has a housing bore that extends between a first housing end and a second housing end along a bearing axis. The bearing is disposed within the housing bore. The bearing has an outer diameter extending between a first bearing end and a second bearing end. The biasing member is disposed between the bearing and the bearing housing to apply a biasing load to the bearing.

Also disclosed is a bearing assembly provided with a gear pump that includes a bearing and a biasing member. The bearing is disposed within a housing bore and has an outer diameter that extends between a first bearing end and a second bearing end. The biasing member has a first arm that engages the outer diameter of the bearing and a second arm that engages the housing bore.

Further disclosed is a bearing assembly provided with a gear pump that includes a bearing and a biasing member. The bearing is disposed within a housing bore. The bearing has an outer diameter, a first bearing arm extending from the outer diameter towards the housing bore, and a second bearing arm spaced apart from the first bearing arm and extending towards the housing bore. The first biasing member is disposed within a first pocket defined by the first bearing arm.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the invention that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
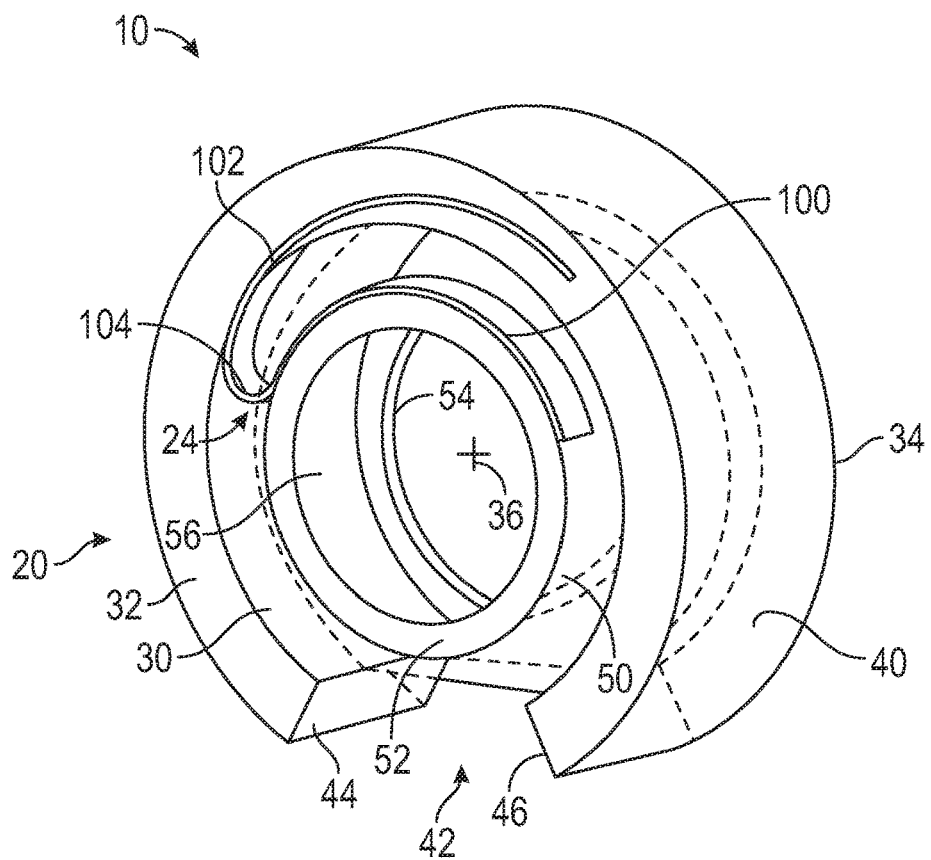
FIG. 1 is a partial view of a portion of a gear pump, specifically a journal bearing supported within a housing.
Figure 2:
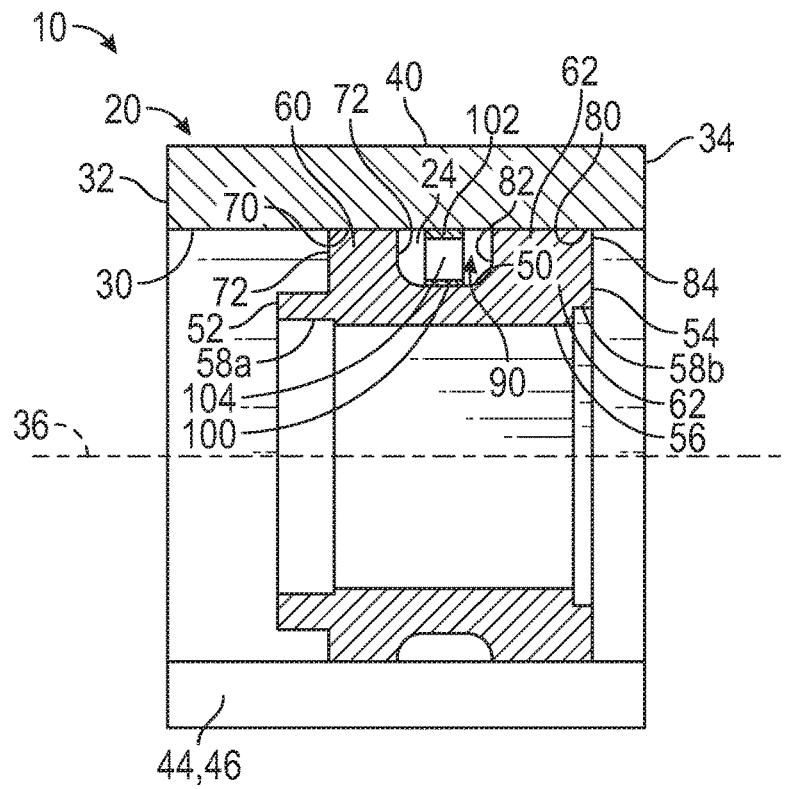
FIG. 2 is a partial cross section view of the portion of the gear pump.
Figure 3:
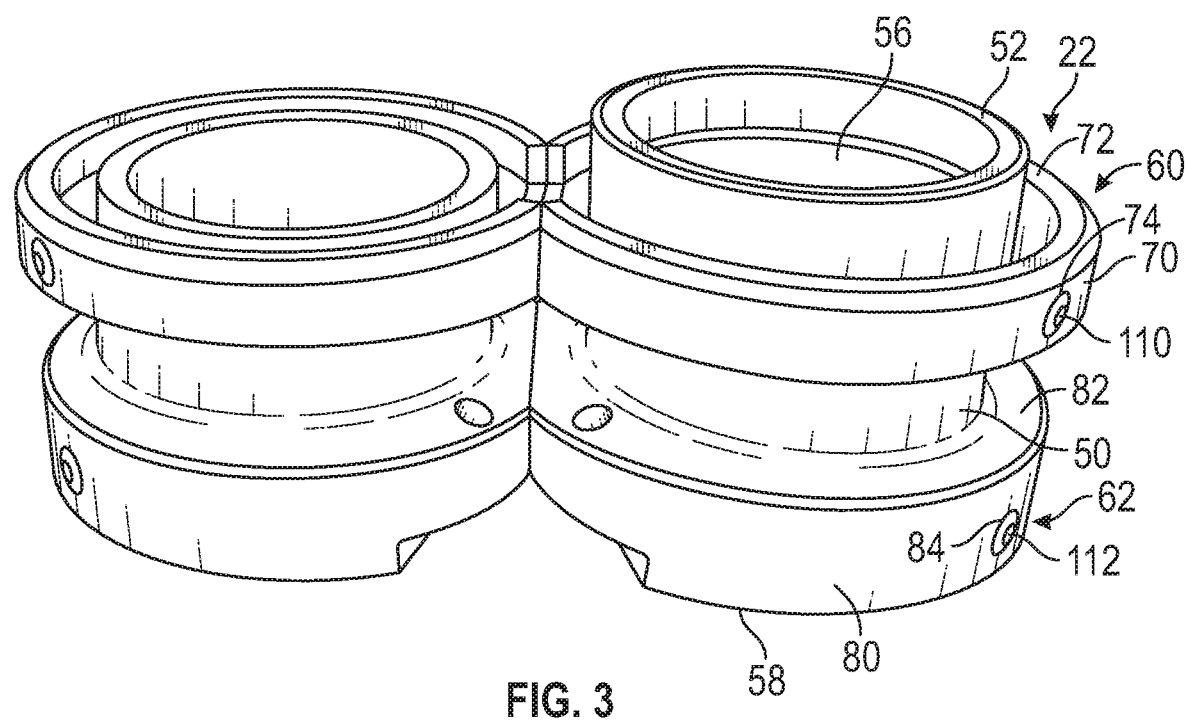
FIG. 3 is a perspective view of a portion of a gear pump of FIG. 1.

Referring to FIGS. 1-3, a gear pump is provided with a bushing or a bearing assembly 10 that is arranged to facilitate the meshing of gears of the gear pump. The bearing assembly 10 may employ tight clearances to reduce internal leakages as well as to improve volumetric efficiencies of the gear pump. The bearing assembly 10 is provided with features that provide positive mechanical loading on bearings to provide for higher volumetric efficiencies with reduced cost, high clearance bearings. The bearing assembly 10 includes a bearing housing 20, a bearing 22, and a biasing member 24.

Referring to FIGS. 1 and 2, the bearing housing 20 includes a housing bore 30 that axially extends between a first housing end 32 and a second housing end 34 along a bearing axis 36. The bearing housing 20 includes an outer surface 40 that is spaced apart from the housing bore 30 and axially extends between the first housing end 32 and the second housing end 34. The bearing housing 20 defines a flat, a notch, or an opening 42 that radially extends from the outer surface 40 towards the housing bore 30. The flat, the notch, or the opening 42 is defined between first and second radial end surfaces 44, 46 of the bearing housing 20.

The flat, the notch, or the opening 42 may abut a flat, a notch, or an opening of another bearing housing, having a substantially similar configuration as the bearing housing 20, which abuts or is coupled to the bearing housing 20, as shown in FIG. 3. The abutment or the coupling of the bearing housings may form a bearing housing assembly.

The bearing 22 is disposed within the housing bore 30 of the bearing housing 20. The bearing 22 includes an external surface or an outer diameter 50 that axially extends between a first bearing end 52 and a second bearing end 54 along the bearing axis 36. The bearing 22 includes an inner surface or an inner diameter 56 that is disposed opposite the outer diameter 50. The inner diameter 56 defines a bearing bore through which another component of the gear pump may extend into.

A first recess 58a radially extends from the inner diameter 56 towards the outer diameter 50 and axially extends from the first bearing end 52 towards the second bearing end 54. A second recess 58b radially extends from the inner diameter 56 towards the outer diameter 50 and axially extends from the second bearing end 54 towards the first bearing end 52. The first recess 58a and the second recess 58b are arranged to facilitate the coupling or connection between the bearing 22 of the bearing assembly 10 and a component of the gear pump.

The bearing 22 includes a first bearing arm 60 and a second bearing arm 62. The second bearing arm 62 is axially spaced apart from the first bearing arm 60, relative to the bearing axis 36.

The first bearing arm 60 radially extends from the outer diameter 50 towards the housing bore 30 along an axis that is disposed generally perpendicular or normal to the bearing axis 36. The first bearing arm 60 is disposed proximate and may be axially spaced apart from the first bearing end 52. The first bearing arm 60 includes a first end surface 70 that radially extends between first side surfaces 72 of the first bearing arm 60, as shown in FIGS. 2 and 3.

The first end surface 70 faces towards and may engage the housing bore 30, as shown in FIG. 2. A first pocket 74 is defined by the first bearing arm 60, as shown in FIG. 3. The first pocket 74 radially extends from the first end surface 70 towards the bearing axis 36.

The second bearing arm 62 radially extends from the outer diameter 50 towards the housing bore 30 along an axis that is disposed generally perpendicular or normal to the bearing axis 36. The second bearing arm 62 is disposed proximate the second bearing end 54. The second bearing arm 62 includes a second end surface 80 that radially extends between second side surfaces 82 of the second bearing arm 62, as shown in FIGS. 2 and 3.

The second end surface 80 faces towards and may engage the housing bore 30, as shown in FIG. 2. The second pocket 84 is defined by the second bearing arm 62, as shown in FIG. 3. The second pocket 84 radially extend from the second end surface 80 towards the bearing axis 36.

A receiving region 90 is defined between the outer diameter 50, a first side surface of the side surfaces 72 of the first bearing arm 60, and a second side surface of the side surfaces 82 of the second bearing arm 62.

Another bearing having a substantially similar configuration as the bearing 22 may be disposed within a housing bore of another bearing housing that abuts the bearing housing 20.

Referring to FIGS. 1 and 2, the biasing member 24 is disposed between the bearing 22 and the bearing housing 20 to apply a clamp load or biasing load to the bearing 22. The biasing member 24 may be a spring, a spring clip, a radial clip or the like that provides a radial force to assure that the bearings are clamped at their respective seal points to increase gear pump efficiency. The biasing member 24 restricts or minimizes bearing 22 motion about or relative to the bearing axis 36 due to gear friction.

Referring to FIG. 2, the biasing member 24 is received within the receiving region 90 such that the biasing member 24 is axially disposed between the first bearing arm 60 and the second bearing arm 62. The biasing member 24 includes a first arm 100, a second arm 102, and a joining region 104. The first arm 100 engages the outer diameter 50 of the bearing 22. The second arm 102 engages the housing bore 30 of the bearing housing 20. The joining region 104 extends between ends of the first arm 100 and the second arm 102 to join the first arm 100 to the second arm 102. The biasing member 24 biases the bearing 22 towards the opening 42.

Referring to FIG. 3, a first biasing member 110 and a second biasing member 112 are provided. The first biasing member 110 and the second biasing member 112 may be a coil spring, linear spring, or an o-ring that provides a radial force to assure that the bearings are clamped at their respective seal points to increase gear pump efficiency. The biasing members 110, 112 restrict or minimize bearing 22 motion about or relative to the bearing axis 36 due to gear friction.

The first biasing member 110 is disposed within the first pocket 74 of the first bearing arm 60. The first biasing member 110 is arranged to engage the housing bore 30 of the bearing housing 20 to apply a load to the bearing 22.

The second biasing member 112 is disposed within the second pocket 84 of the second bearing arm 62. The second biasing member 112 is arranged to engage the housing bore 30 of the bearing housing 20 to apply a load to the bearing 22.

Biasing members may also be provided with another bearing that may be received in another bearing housing that abuts the bearing housing 20. The biasing members may be radially spaced apart from the first biasing member 110 and the second biasing member 112 such that the bearings are biased towards each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described. Additionally, while various embodiments of the present disclosure have been described, it is to be understood that aspects of the present disclosure may include only some of the described embodiments. Accordingly, the present disclosure is not to be seen as limited by the foregoing description.

What is claimed is:

1. A bearing assembly for a gear pump, comprising:
a bearing housing having a housing bore that extends between a first housing end and a second housing end along a bearing axis;
a bearing disposed within the housing bore, the bearing having an outer diameter extending between a first bearing end and a second bearing end; and
a biasing member disposed between the bearing and the bearing housing to apply a biasing load to the bearing;
wherein the bearing housing defines an opening that radially extends from an outer surface of the bearing housing towards the housing bore.

2. The bearing assembly of claim 1, wherein the biasing member includes a first arm that engages the outer diameter of the bearing and a second arm that engages the housing bore.

3. A bearing assembly for a gear pump, comprising:
a bearing housing having a housing bore that extends between a first housing end and a second housing end along a bearing axis;
a bearing disposed within the housing bore, the bearing having an outer diameter extending between a first bearing end and a second bearing end; and
a biasing member disposed between the bearing and the bearing housing to apply a biasing load to the bearing;
wherein the bearing includes a first bearing arm that radially extends from the outer diameter towards the housing bore.

4. The bearing assembly of claim 3, wherein the biasing member is axially disposed between the first bearing arm and the second bearing end.

5. The bearing assembly of claim 3, wherein the bearing includes a second bearing arm that is axially spaced apart from the first bearing arm and radially extends from the outer diameter towards the housing bore.

6. The bearing assembly of claim 5, wherein the second bearing arm defines a pocket that receives the biasing member.

7. The bearing assembly of claim 5, wherein the first bearing arm, the outer diameter, and the second bearing arm define a receiving region.

8. The bearing assembly of claim 7, wherein the biasing member is disposed within the receiving region.

9. A bearing assembly provided with a gear pump, comprising:
a bearing disposed within a housing bore, the bearing having an outer diameter that extends between a first bearing end and a second bearing end; and
a biasing member having a first arm that engages the outer diameter of the bearing and a second arm that engages the housing bore.

10. The bearing assembly of claim 9, wherein the bearing includes a first bearing arm and a second bearing arm that is axially spaced apart from the first bearing arm.

11. The bearing assembly of claim 10, wherein the biasing member is disposed between the first bearing arm and the second bearing arm.

* * * * *